US007693459B2

(12) United States Patent
Fujita et al.

(10) Patent No.: US 7,693,459 B2

(45) Date of Patent: Apr. 6, 2010

(54) CHARGING DEVICE FOR CHARGING A SURFACE OF A LATENT IMAGE BEARING MEMBER AND AN IMAGE FORMING APPARATUS INCLUDING THE CHARGING DEVICE

(75) Inventors: Tetsumaru Fujita, Nishinomiya (JP); Yoshio Sakagawa, Ashiya (JP); Yuji Nagatomo, Minoh (JP)

(73) Assignee: Ricoh Company Limited, Tokyo (JP)

( * ) Notice: Subject to any disclaimer, the term of this patent is extended or adjusted under 35 U.S.C. 154(b) by 1 day.

(21) Appl. No.: 11/855,687

(22) Filed: Sep. 14, 2007

(65) Prior Publication Data

US 2008/0069592 A1 Mar. 20, 2008

(30) Foreign Application Priority Data

Sep. 15, 2006 (JP) ............................ 2006-251636

(51) Int. Cl.
*G02G 15/02* (2006.01)
*G03G 21/10* (2006.01)

(52) U.S. Cl. ...................................................... 399/176

(58) Field of Classification Search ................. 399/176, 399/100, 174, 115, 299, 306
See application file for complete search history.

(56) References Cited

U.S. PATENT DOCUMENTS 6,807,384 B2 * 10/2004 Okubo et al. ................. 399/50
2007/0065179 A1 3/2007 Fujita
2007/0172259 A1 7/2007 Fujita

FOREIGN PATENT DOCUMENTS

JP 08044158 A * 2/1996
JP 10073983 A * 3/1998
JP 2001-337519 12/2001
JP 2007322989 A * 12/2007

OTHER PUBLICATIONS

Computer Translation JP08-044158A; Computer Translation JP10-073983A.*

* cited by examiner

*Primary Examiner*—Quana M Grainger
(74) *Attorney, Agent, or Firm*—Oblon, Spivak, McClelland, Maier & Neustadt, L.L.P.

(57) ABSTRACT

A charging device and an image forming apparatus using the charging device. The charging device includes a charging member to uniformly charge a surface of a latent image bearing member in contact therewith, a charge bias application unit to apply a charge bias to the charging member, a conductive member to contact a surface of the charging member, and a different-valued bias application unit to apply a different-valued bias different from the charge bias to the conductive member. The image forming apparatus includes a latent image bearing member to bear a latent image, a latent image forming unit to form the latent image on the latent image bearing member, a development unit to develop the latent image with toner, and the charging device.

14 Claims, 5 Drawing Sheets

CHARGING DEVICE FOR CHARGING A SURFACE OF A LATENT IMAGE BEARING MEMBER AND AN IMAGE FORMING APPARATUS INCLUDING THE CHARGING DEVICE

CROSS-REFERENCE TO RELATED APPLICATION

This patent specification is based on Japanese Patent Application No. 2006-251636 filed on Sep. 15, 2006 in the Japan Patent Office, the entire contents of which are incorporated by reference herein.

BACKGROUND

1. Field of the Invention

The present invention relates to a charging device and an image forming apparatus using the charging device.

2. Discussion of the Related Art

In an electrophotographic image forming apparatus, an image is formed by the processes of uniformly charging a latent image bearing member such as a photosensitive element with a charging device; irradiating the latent image bearing member with light to form a latent electrostatic image thereon; attaching toner to the latent electrostatic image to form a toner image; and transferring the toner image onto a recording medium, for example, a transfer sheet, directly from the latent image bearing member or via an intermediate transfer unit.

As the charging device for use in the image forming apparatus, there is known a charging device that uniformly charges the latent image bearing member by applying a charge bias to a charging member, for example, a charging roller, a charging brush roller, etc., that contacts the latent image bearing member to cause a discharge between the charging member and the latent image bearing member.

However, with such a charging device, reversely charged toner present in residual toner remaining after transfer accumulates on the charging member, which causes deterioration of image quality. Specifically, after a transfer process in which a toner image is transferred onto the intermediate transfer unit or the recording medium, a small amount of toner remains on the surface of the latent image bearing member. This residual toner contains a relatively large amount of reversely charged toner. The reversely charged toner is transferred to the charging member that contacts the surface of the latent image bearing member and accumulates thereon. This accumulation prevents uniform charging of the latent image bearing member, which causes deterioration of image quality. This problem is particularly acute in an image forming apparatus employing a cleaner-less system instead of a cleaning unit that mechanically scrapes residual toner from a latent image bearing member, because in the cleaner-less system residual toner is electrostatically collected into a development unit and therefore a large amount of residual toner contacts the charging member.

SUMMARY

This patent specification describes a novel charging device that includes a charging member to uniformly charge a surface of a latent image bearing member in contact therewith, a charge bias application unit to apply a charge bias to the charging member, a conductive member to contact a surface of the charging member, and a different-valued bias application unit to apply a different-valued bias different from the charge bias to the conductive member.

This patent specification further describes a novel image forming apparatus that includes a latent image bearing member to bear a latent image, a latent image forming unit to form the latent image on the latent image bearing member, a development unit to develop the latent image on the latent image bearing member with toner, and a charging device. The charging device includes a charging member to uniformly charge a surface of the latent image bearing member in contact therewith, a charge bias application unit to apply a charge bias to the charging member, a conductive member to contact a surface of the charging member, and a different-valued bias application unit to apply a different-valued bias different from the charge bias to the conductive member.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
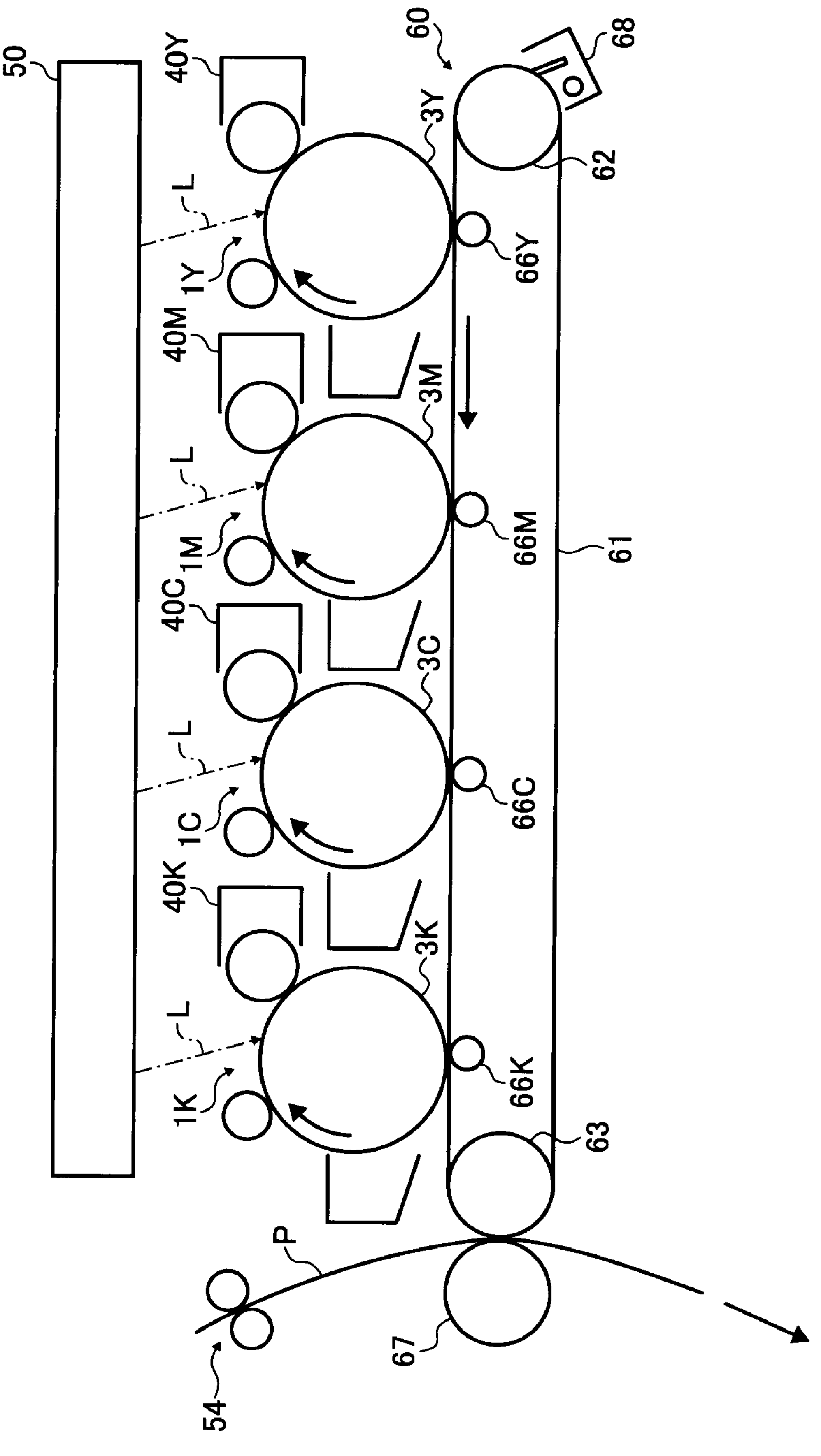
FIG. 1 is a schematic diagram of a printer according to an embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 2:
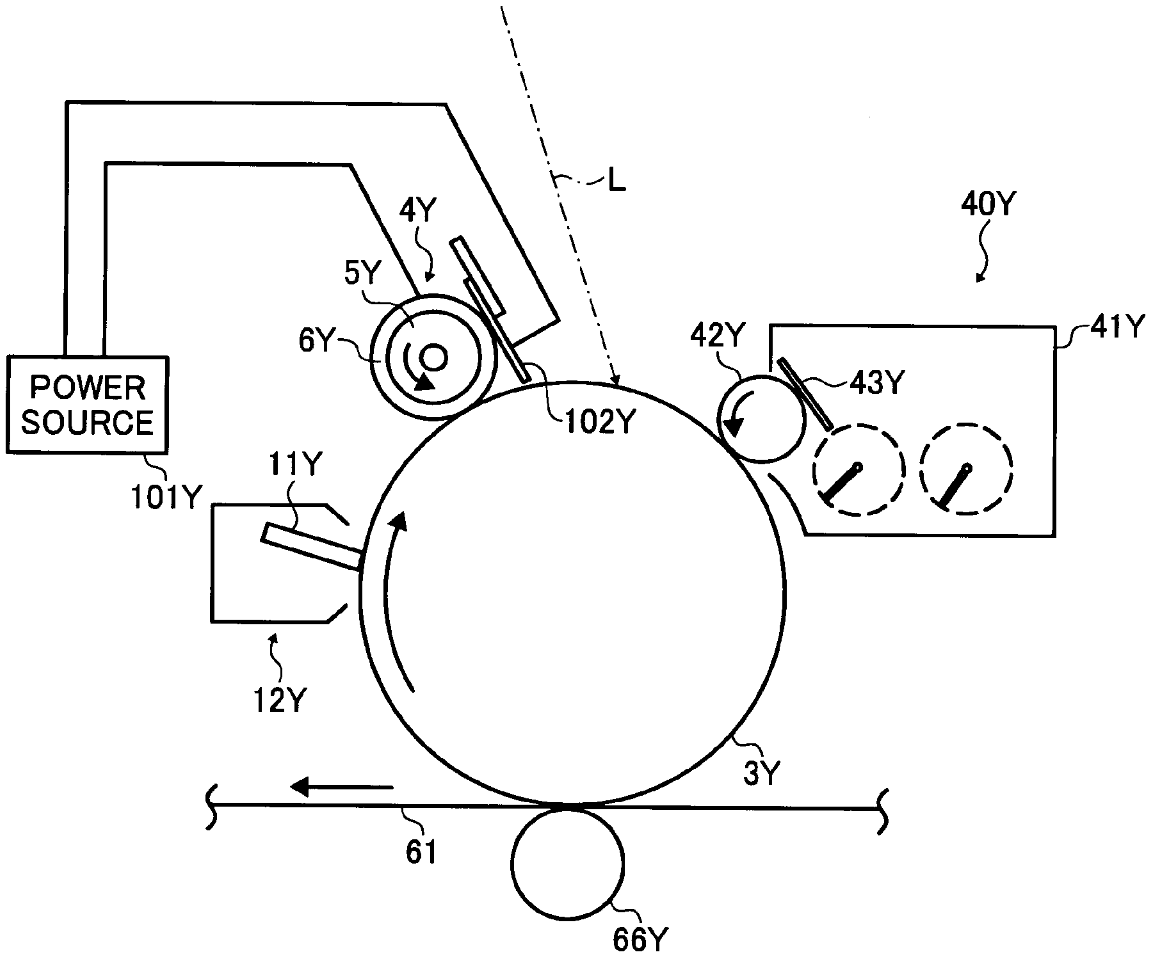
FIG. 2 is an enlarged view of a process unit for Y and an intermediate transfer belt of the printer shown in FIG. 1.

Referring now to the drawings, wherein like reference numerals designate identical or corresponding parts throughout the several views, particularly to FIG. 2, charging devices according to exemplary embodiments of the present invention are described.

FIG. 1 is a schematic diagram of an electrophotographic color laser printer (hereinafter referred to as printer) according to an embodiment of the present invention. The printer includes four process units 1Y, 1M, 1C, and 1K for forming toner images of four colors of yellow, magenta, cyan, and black, which are abbreviated as Y, M, C, and K, respectively. The abbreviations Y, M, C, and K, affixed to the reference numerals, indicate members for yellow, magenta, cyan, and black, respectively.

The printer also includes an optical writing unit 50, a pair of registration rollers 54, a transfer unit 60, and so forth.

The optical writing unit 50 includes an optical source having four laser diodes corresponding to the four colors, a polygon mirror of regular hexahedron shape, a polygon motor for rotating the polygon mirror, an fθ lens, a lens, and a reflecting mirror. When one of the laser diodes emits a laser beam L, the laser beam L is reflected at one surface of the polygon mirror, is deflected in accordance with rotation of the polygon mirror, and reaches one of four photosensitive elements 3Y, 3M, 3C, and 3K. Thus, surfaces of the four photosensitive elements 3Y, 3M, 3C, and 3K are optically scanned with the laser beams L emitted by the four laser diodes.

The process units 1Y, 1M, 1C, and 1K include the drum-like photosensitive elements 3Y, 3M, 3C, and 3K, respectively that serve as latent image bearing members and development devices 40Y, 40M, 40C, and 40K, respectively that correspond to the photosensitive elements 3Y, 3M, 3C, and 3K, respectively. Each of the photosensitive elements 3Y, 3M, 3C, and 3K includes a tube of, for example, aluminum, coated with an organic photosensitive layer, and is rotated clockwise in FIG. 1 at a linear speed by a drive unit, not shown. The optical writing unit 50 optically scans the surfaces of the photosensitive elements 3Y, 3M, 3C, and 3K in the dark with the laser beams L, which are modulated based on image information from a personal computer, not shown, and the photosensitive elements 3Y, 3M, 3C, and 3K bear latent electrostatic images of Y, M, C, and K, respectively.

FIG. 2 is an enlarged view of the process unit 1Y and an intermediate transfer belt 61 of the transfer unit 60 shown in FIG. 1. As shown in FIG. 2, the process unit 1Y includes the photosensitive element 3Y, a charging roller 4Y, a discharging lamp, not shown, the development device 40Y serving as a development unit, etc., which are housed in a unit casing (holder) as a single unit detachably installed in the printer.

The photosensitive element 3Y is a drum of approximately 24 mm in diameter and includes a conductive substrate formed of an aluminum tube coated with a photosensitive layer formed of an organic photoconductive material having a negative charge property. The photosensitive element 3Y is rotationally driven clockwise in FIG. 2 at a linear speed by a drive unit, not shown.

The charging roller 4Y serving as a charging member includes a core bar 5Y coated with a conductive elastic layer 6Y, forming a roller shape. Shaft portions protruding from both ends of the core bar 5Y in a longitudinal direction are rotatably received by shaft bearings, not shown, on each end. The conductive elastic layer 6Y is formed by dispersing conductive particles such as carbon powder in an elastic material such as rubber, resin, etc., and exhibits adequate elasticity and electrical resistance. The core bar 5Y is connected to a bias application unit that applies a charge bias thereto. The bias application unit includes a power source 101Y for outputting a charge bias, a wire for electrically connecting the power source 101Y and the core bar 5Y, etc. In the printer according to the present embodiment, the charging roller 4Y and the bias application unit form a charging device. The charging roller 4Y is provided in the process unit 1Y. In addition, the charging roller 4Y, the photosensitive element 3Y, etc. are detachably installed in the printer as a single unit.

As the charge bias applied to the charging roller 4Y, a direct-current (DC) voltage or an overlapped voltage in which a DC voltage is overlapped with an alternating-current (AC) voltage can be used. When the DC voltage bias is applied, the photosensitive elements 3Y, 3M, 3C, and 3K are charged with the same polarity as that of the DC voltage (negative polarity in the present embodiment). When the overlapped voltage is applied, the photosensitive elements 3Y, 3M, 3C, and 3K are charged with the same polarity as that of the DC component (DC voltage) of the overlapped voltage. That is, the photosensitive elements 3Y, 3M, 3C, and 3K are charged with the same polarity as that of the DC voltage of the charge bias. In an image forming apparatus that employs a reversal development system, for example, the printer according to the present embodiment, a regular charging polarity of toner is the same as that of the DC voltage. Reversely charged toner is charged with a reverse polarity to that of the DC voltage.

On the surface of the photosensitive element 3Y uniformly charged by the charging device, a latent electrostatic image for Y is formed by scanning by the optical writing unit 50. Then, the development device 40Y develops the latent electrostatic image to form a Y toner image.

The development device 40Y includes a development roller 42Y, part of which protrudes from the opening in a casing 41Y. The development roller 42Y has a shaft that protrudes from both ends thereof in a longitudinal direction and is rotatably received by a shaft bearing, not shown, on each end. The casing 41Y contains Y toner, not shown, that is supplied to the development roller 42Y while agitated by two agitating members. The Y toner is adhered to and carried up to the surface of the development roller 42Y. As the development roller 42Y rotates, the Y toner thereon moves to the position where the Y toner contacts a regulator blade 43Y. Then, the regulator blade 43Y regulates the thickness of the Y toner layer. Thereafter, the Y toner is conveyed to a development region that faces the photosensitive element 3Y.

In the development region, a developing potential between the latent electrostatic image on the photosensitive element 3Y and the development roller 42Y to which a developing bias having a negative polarity is applied from a power source, not shown, acts on the Y toner having a negative polarity on the development roller 42Y to electrostatically transfer the Y toner to the latent electrostatic image. In addition, a non-developing potential exists between the development roller 42Y and a uniformly charged portion (background portion) on the photosensitive element 3Y to electrostatically transfer the Y toner having a negative polarity from the background portion to the development roller 42Y. The Y toner on the development roller 42Y is transferred to the latent electrostatic image on the photosensitive element 3Y by the developing potential. By this transfer, the latent electrostatic image on the photosensitive element 3Y is developed into a Y toner image.

In the printer according to the present embodiment, the development device 40Y employs a one-component developer system to use a one-component developer containing the Y toner as a main component as a developer. The development device 40Y can also employ a two-component developer system to use a two-component developer containing the Y toner and a magnetic carrier.

The Y toner image on the photosensitive element 3Y is intermediately transferred onto the intermediate transfer belt 61 at a primary transfer nip for Y where the photosensitive element 3Y contacts the intermediate transfer belt 61. After the Y toner image passes through the primary transfer nip, toner remaining on, i.e., not transferred to the intermediate transfer belt 61 adheres to the surface of the photosensitive element 3Y. The residual toner is removed from the surface of the photosensitive element 3Y by a cleaning blade 11Y provided in a drum cleaning device 12Y that contacts the photosensitive element 3Y.

It should be noted that although only the process unit 1Y is described above, the other process units 1M, 1C, and 1K have the same configuration, and therefore descriptions thereof are omitted as redundant.

In FIG. 1, the transfer unit 60 is provided below the process units 1Y, 1M, 1C, and 1K. In the transfer unit 60, the endless intermediate transfer belt 61 is suspended by a plurality of stretch rollers and rotates counterclockwise in FIG. 1 in an endless manner. The plurality of stretch rollers includes a driven roller 62, a driving roller 63, four primary transfer bias rollers 66Y, 66M, 66C, and 66K, etc.

All of the driven roller 62, the primary transfer bias rollers 66Y, 66M, 66C, and 66K, and the driving roller 63 contact the back side of the intermediate transfer belt 61 (the inner side of the loop). Each of the four primary transfer bias rollers 66Y, 66M, 66C, and 66K is a roller that includes a metal core bar covered with an elastic body, for example, a sponge. The four primary transfer bias rollers 66Y, 66M, 66C, and 66K are pressed against the photosensitive elements 3Y, 3M, 3C, and 3K, respectively, with the intermediate transfer belt 61 therebetween. The four photosensitive elements 3Y, 3M, 3C, and 3K form four primary transfer nips for Y, M, C, and K with the intermediate transfer belt 61 with a predetermined length in the belt moving direction.

A primary transfer bias that is subjected to constant current control by a transfer bias power source, not shown, is applied to the core bars of the four primary transfer bias rollers 66Y, 66M, 66C, and 66K, thus imparting a transfer charge to the back side of the intermediate transfer belt 61 through the four primary transfer bias rollers 66Y, 66M, 66C, and 66K. A transfer electric field is generated between the intermediate transfer belt 61 and the photosensitive elements 3Y, 3M, 3C, and 3K in each of the primary transfer nips. The primary transfer bias rollers 66Y, 66C, 66M, and 66K are provided as primary transfer units in the printer according to the present embodiment. Instead of rollers, a brush, a blade, etc., can also be used. In addition, a transfer charger can also be used as the primary transfer unit.

The Y, M, C, and K toner images formed on the photosensitive elements 3Y, 3M, 3C, and 3K, respectively, are superimposed one atop another and transferred onto the intermediate transfer belt 61 at the primary transfer nips, and a four-color superimposed toner image (hereinafter referred to as four-color toner image) is formed on the intermediate transfer belt 61.

A secondary transfer bias roller 67 contacts the front side of the intermediate transfer belt 61 at a position where the intermediate transfer belt 61 is suspended around the driving roller 63, to form a secondary transfer nip. To the secondary transfer bias roller 67, a secondary transfer bias is applied by a voltage application unit including a power source, not shown, and wiring. The secondary transfer bias generates a secondary transfer electric field between the secondary transfer bias roller 67 and the driving roller 63, which is grounded. The four-color toner image formed on the intermediate transfer belt 61 enters the secondary transfer nip with the endless movement of the intermediate transfer belt 61.

The printer according to the present embodiment includes a sheet cassette, not shown, where a plurality of recording sheets P are stored. The uppermost recording sheet P is fed out to a sheet feeding path at a particular timing. The recording sheet P is sandwiched at the registration nip between the registration rollers 54 provided at the end portion of the sheet feeding path.

Each of the registration rollers 54 is rotationally driven to sandwich the recording sheet P conveyed from the sheet cassette and stops rotating immediately after sandwiching the leading edge of the recording sheet P. Then, the registration rollers 54 send out the recording sheet P to the secondary transfer nip in sync with the four-color toner image on the intermediate transfer belt 61. The four-color toner image on the intermediate transfer belt 61 is secondarily transferred onto the recording sheet P at one time by the secondary transfer electric field and nip pressure. The four-color toner image forms a full color image in combination with the white background color of the recording sheet P.

The recording sheet P on which the full color image is formed is fed out from the secondary transfer nip and is conveyed to a fixing device, not shown, to fix the full color image.

Toner remaining on the front side of the intermediate transfer belt 61 is removed by a belt cleaning device 68 after the intermediate transfer belt 61 passes the secondary transfer nip.

In the printer having the above-described basic configuration, each of the photosensitive elements 3Y, 3M, 3C, and 3K functions as a latent image bearing member that bears a latent image on the surface thereof, which is endlessly moving by rotation. The optical writing unit 50 functions as a latent image forming unit that forms a latent image on each of the uniformly charged surfaces of the photosensitive elements 3Y, 3M, 3C, and 3K. The development devices 40Y, 40M, 40C, and 40K function as development units that develop a latent image on the photosensitive elements 3Y, 3M, 3C, and 3K, respectively, with toner.

As described above with reference to FIG. 2, residual toner adheres to the surface of the photosensitive element 3Y that has passed the primary transfer nip where the photosensitive element 3Y contacts the intermediate transfer belt 61. This residual toner is removed from the surface of the photosensitive element 3Y by the drum cleaning device 12Y. However, not all the residual toner may be completely removed from the surface of the photosensitive element 3Y by the drum cleaning device 12Y. In other words, a minute amount of toner may still remain on the surface of the photosensitive element 3Y after the cleaning by the drum cleaning device 12Y. In addition, in recent years, polymerized toner that has a relatively small particle diameter and a high average circularity has been used instead of pulverized toner having a relatively large diameter of irregular form. This makes it difficult to remove such toner remaining after transfer. Thus, a minute amount of toner easily remains on the surface of a photosensitive element and is not removed by cleaning.

A minute amount of the toner remaining on the surface of photosensitive element 3Y after the cleaning process enters a charging nip where the photosensitive element 3Y contacts the charging roller 4Y as the surface of the photosensitive element 3Y moves. Reversely charged toner (positive polarity in the present embodiment) is present in the residual toner in large amounts and is easily transferred from the surface of the photosensitive element 3Y to the surface of the charging roller 4Y when entering the charging nip. By this transfer, the reversely charged toner accumulates on the surface of the charging roller 4Y (toner contamination), which causes insufficient charging locally on the photosensitive element 3Y, resulting in generation of vertical black streaks in an image.

In the printer according to the present embodiment, a toner charge promotion unit is provided to charge the reversely charged toner that has been transferred to the surface of the charging roller 4Y with the regular polarity to immediately return the reversely charged toner to the surface of the photosensitive element 3Y. The toner charge promotion unit includes a conductive sheet 102Y, the bias application unit that applies a different-valued bias to the conductive sheet 102Y, etc. The different-valued bias is described later. The conductive sheet 102Y is a conductive member contacting the surface of the charging roller 4Y at a position different from the charging nip. The bias application unit applies the charge bias from the power source 101Y to the core bar 5Y of the charging roller 4Y as described above. The bias application unit also outputs a different-valued bias from the power source 101Y in addition to the charge bias. The toner charge promotion unit also includes a wire that connects the bias application unit and the conductive sheet 102Y.

The different-valued bias is a bias having a value different from the charge bias. When the different-valued bias is applied to the conductive sheet 102Y while the charge bias is applied to the charging roller 4Y, a potential difference is induced between the surface of the charging roller 4Y and the conductive sheet 102Y. This potential difference causes a discharge between the surface of the charging roller 4Y and the surface of the conductive sheet 102Y, thereby charging reversely charged toner present on the charging roller 4Y with the regular polarity. In the present embodiment, the regular polarity of toner is negative, i.e., the same as that of the uniform charging of the photosensitive element 3Y. The charging roller 4Y is relatively high in absolute potential compared to the photosensitive element 3Y. Thus, after the reversely charged toner is charged with the regular polarity, i.e., negatively charged, the toner returns from the surface of the charging roller 4Y to the surface of the photosensitive element 3Y at the charging nip. Namely, the reversely charged toner that has been transferred from the surface of the photosensitive element 3Y to the surface of the charging roller 4Y is re-charged with the regular polarity and immediately returns to the surface of the photosensitive element 3Y. Therefore, deterioration of image quality (highly concentrated toner streaks extending in the sub-scanning direction in particular) caused by accumulation of reversely charged toner on the charging roller 4Y can be reduced.

A DC voltage or an overlapped voltage in which a DC voltage is overlapped with an AC voltage can be used as the different-valued bias. In any case, the DC voltage of the different-valued bias has the same polarity as that of the DC voltage of the charge bias and is relatively high compared to the DC voltage of the charge bias to generate a discharge that imparts a charge having the same polarity as that of the DC voltage of the charge bias from the conductive sheet 102Y to the charging roller 4Y. Thus, the reversely charged toner can be charged with the regular polarity at the position close to the contact point (hereinafter referred to as toner charge promoting nip) between the charging roller 4Y and the conductive sheet 102Y as the reversely charged toner moves with the surface of the charging roller 4Y.

At a position close to the charging nip where the charging roller 4Y contacts the photosensitive element 3Y, the reversely charged toner remains on the photosensitive element 3Y. At this point, a discharge is generated to impart a charge having the same polarity as that of the DC voltage of the charge bias from the charging roller 4Y to the photosensitive element 3Y. The discharge promotes charging of the reversely charged toner on the photosensitive element 3Y with the regular polarity. When the reversely charged toner is not charged with the regular polarity by the discharge, the reversely charged toner transfers to the charging roller 4Y in the charging nip. Once transferred onto the charging roller 4Y, the reversely charged toner remains not on the photosensitive element 3Y but on the charging roller 4Y at a position close to the charging nip. In that case, since a charge (having the same polarity as that of the DC voltage of the charge bias) emitted from the surface of the charging roller 4Y passes through the reversely charged toner on the charging roller 4Y to the photosensitive element 3Y, the reversely charged toner is not charged with the regular polarity at a position close to the charging nip. In the printer according to the present embodiment, the conductive sheet 102Y contacts the charging roller 4Y to discharge therebetween so that the reversely charged toner on the charging toner 4Y is charged with the regular polarity.

It should be noted that although the configuration of the process unit 1Y is described above with reference to FIG. 2, each of the other process units 1M, 1C, and 1K is provided with the same toner charge promotion unit.

The effectiveness of the toner charge promotion unit can be confirmed by using a test apparatus having the same configuration as that of the printer according to the present embodiment illustrated in FIG. 1. K toner used in the test is manufactured by externally adding an additive to mother particles having an average particle diameter of 8.5 μm prepared by a pulverization method. A monochrome halftone image is printed on an A4 sheet with an image area ratio of 5% while rotating photosensitive elements 3Y, 3M, 3C, and 3K at a linear speed of 100 mm/s. A charging roller for K has a diameter of 10 mm formed of a 6 mm diameter core bar coated with a conductive elastic layer having a thickness of 2 mm. To accumulate reversely charged toner on the charging roller 4K in a short period of time, the drum cleaning device 12K is removed from the process unit 1K to employ a cleanerless system, which is described later. K toner that is charged with a regular polarity and contained in the toner remaining after the transfer process can be collected on the development roller 42K in the development region without using a drum cleaning device. By comparison, the reversely charged toner contained in the residual toner transfers to the charging roller 4K, which tends to cause filming on the photosensitive element 3K.

Figure 3:
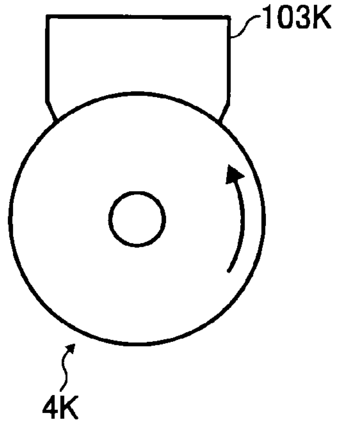
FIG. 3 is an enlarged view of a conductive sponge and a charging roller.

Three types of conductive members are individually used as the conductive member that contacts the charging roller 4K. One conductive member is a conductive sponge 103K, illustrated in FIG. 3. The conductive sponge 103K is a sponge manufactured by foaming an insulating urethane material in which conductive particles of carbon are dispersed. The surface resistance of the conductive sponge 103K is $10^5$ Ω. cm. The conductive sponge 103K contacts the charging roller 4K with an engaging amount of 0.1 mm.

Figure 4:
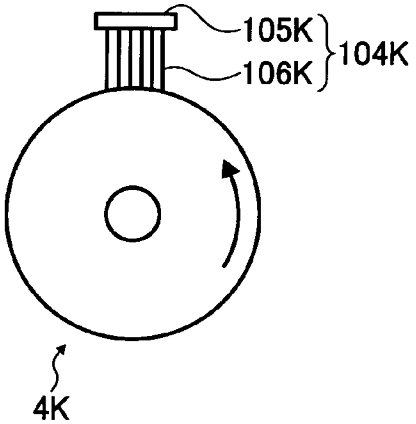
FIG. 4 is an enlarged view of a conductive brush and a charging roller.

Another conductive member is a conductive brush 104K, illustrated in FIG. 4. The conductive brush 104K includes a conductive substrate 105K and a plurality of conductive fibers 106K projecting from the substrate 105K. The conductive fibers 106K are prepared by extending an insulating nylon material in which carbon particles are dispersed into 5 denier thick threads. The surface resistance of the conductive fibers 106K is $10^5$ Ω. cm. In the conductive brush 104K, the conductive fibers 106K are fitted to the substrate 105K with an density of 100,000/inch$^2$. The length of the conductive fibers 106K measured from the surface of the substrate 105K is 5 mm. The conductive fibers 106K of the conductive brush 104K contacts the charging roller 4K as illustrated in FIG. 4.

Figure 5:
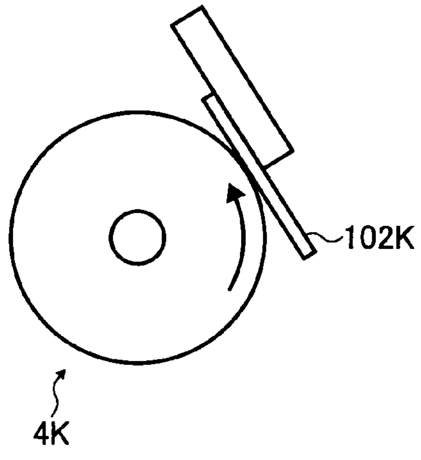
FIG. 5 is an enlarged view of a conductive sheet and a charging roller.

Still another conductive member is a conductive sheet 102K, illustrated in FIG. 5. The conductive sheet 102K is formed of a material in which carbon black is dispersed in polyvinylidene fluoride (PVDF). The surface resistance of the conductive sheet 102K is $10^5$ Ω. cm. The thickness of the conductive sheet 102K is 0.1 mm. The conductive sheet 102K is supported in a cantilevered manner and the free end of the conductive sheet 102K contacts the charging roller 4K as illustrated in FIG. 5.

The 5% halftone image is continuously output on 1,000 A4 sheets for each of the three conductive members to check whether vertical black streaks caused by accumulation of the K toner on the charging roller 4K are observed on the half chart of the 1,000th sheet. To evaluate the effectiveness of the toner charge promotion unit, the results are scaled in rank as follows: Poor (many large vertical black streaks observed), Fair (less than or equal to 10 small vertical black streaks observed), Good (no vertical black streak observed in a two-by-two image at 600 dpi), and Excellent (no vertical black streak observed in a one-by-one image at 600 dpi). The figures before and after "by" in "two-by-two" and "one-by-one" represent the minimum distance between dots in halftone printing. In a one-by-one image in which halftone is represented by a one-by-one method, the minimum distance between dots is equal to twice a dot length. In a two-by-two image in which halftone is represented by a two-by-two method, the minimum distance between dots is equal to four times a dot length. The results are shown in TABLE 1 below, where an overlapped bias is a voltage in which a DC voltage of −1,100 V is overlapped with an AC voltage of −300 V that has a duty ratio of 50% and a frequency of 500 Hz.

ing roller 4K with the regular polarity. At this point, there is reversely charged toner that is insufficiently charged with the regular polarity, and such toner is not sufficiently transferred from the charging roller 4K to the photosensitive element 3K.

It is possible to further charge the toner that is minutely charged with the regular polarity with the regular polarity by the discharge occurring in minute gaps in the toner charge promoting nip. By using the conductive sheet 102K that forms a relatively large number of minute gaps, the reversely charged toner returns to the photosensitive element 3K immediately when compared with the other conductive members.

In addition, each of the conductive brush 104K and the conductive sponge 103K tends to take in reversely charged toner or toner that is insufficiently charged with the regular polarity between fibers or foam cells thereof.

As a result, the conductive sheet 102K is considered to achieve the best result.

As for the conductive fibers 106K, these may be formed by dispersing conductive particles in resin materials, for example, acrylic, Teflon (registered trademark), etc., in addition to nylon.

TABLE 1

| | | Potential | Evaluation results of filming | | |
|---|---|---|---|---|---|
| Charge bias (V) | Different-valued bias (V) | difference (V) | Conductive sponge | Conductive brush | Conductive sheet |
| DC −1,100 | DC −1,200 | −100 | Poor | Fair | Good |
| DC −1,100 | DC −1,300 | −200 | Fair | Good | Excellent |
| DC −1,100 | DC −1,400 | −300 | Good | Good | Excellent |
| DC −1,100 | Overlapped bias | 0 to −300 | Good | Excellent | Excellent |

TABLE 1 shows the results of when one of the conductive sponge 103K, the conductive brush 104K, and the conductive sheet 102K is used as the conductive member. The present inventors have confirmed that the result is Poor when no conductive member is used. As can be seen in TABLE 1, generation of vertical black streaks is reduced with the use of each conductive member, compared with when no conductive member is used. In addition, as the potential difference between the charge bias and the different-valued bias increases, generation of vertical black streaks is reduced.

The conductive sheet 102K has an excellent effect of reducing contamination of the surface of the charging roller 4K with the reversely charged toner, followed by the conductive brush 104K and then the conductive sponge 103K, as shown in TABLE 1. The reason for this is considered to be as follows: A discharge between the conductive member, for example, the conductive sheet 102K, and the charging roller 4K also occurs in the toner charge promoting nip where the conductive member contacts the charging roller 4K. In the toner charge promoting nip, the conductive member does not completely contact the charging roller 4K and minute gaps are locally formed. It is in the minute gaps that the discharge occurs. Of the three conductive members, more of these minute gaps are formed for the conductive sheet 102K than for either of the other two. The conductive brush 104K and the conductive sponge 103K form a relatively small number of such minute gaps due to the brush-like and foam-like configurations thereof, respectively. A discharge occurring at a position close to the toner charge promoting nip imparts a charge from the conductive member, thereby charging the reversely charged toner remaining on the surface of the charg- The conductive sheet 102K may be formed by dispersing conductive particles in resin materials, for example, nylon, polytetrafluoroethylene (PTFE), urethane, polyethylene, etc., other than PVDF.

There is reversely charged toner that enters the toner charge promoting nip where the conductive member, for example, the conductive sheet 102K contacts the charging member, for example, the charging roller 4K without being charged with the regular polarity just before entering the toner charge promoting nip. In the toner charge promoting nip, such reversely charged toner is attracted to the conductive member having a higher potential of the regular polarity while pressed against both the charging member and the conductive member. At minute gaps in the toner charge promoting nip or the exit of the toner charge promoting nip, the reversely charged toner transfers from the surface of the charging member to the surface of the conductive member. This reversely charged toner is not charged with the regular polarity by the discharge that may occur later and accumulates on the surface of the conductive member. To deal with this, it is preferable to periodically reverse the inequality relation between the DC voltage of the different-valued bias and the DC voltage of the charge bias at times between the image forming operations, for example, before or after printing, or immediately after powering on the printer, etc. Thus, it is possible to charge the reversely charged toner on the conductive member with the regular polarity of toner by causing a discharge between the charging member and the conductive member that imparts a charge of the same polarity as that of the DC voltage, i.e., the regular polarity of toner from the charging member to the conductive member. Therefore, it is possible to periodically remove the reversely charged toner accumulating on the conductive member.

Figure 6:
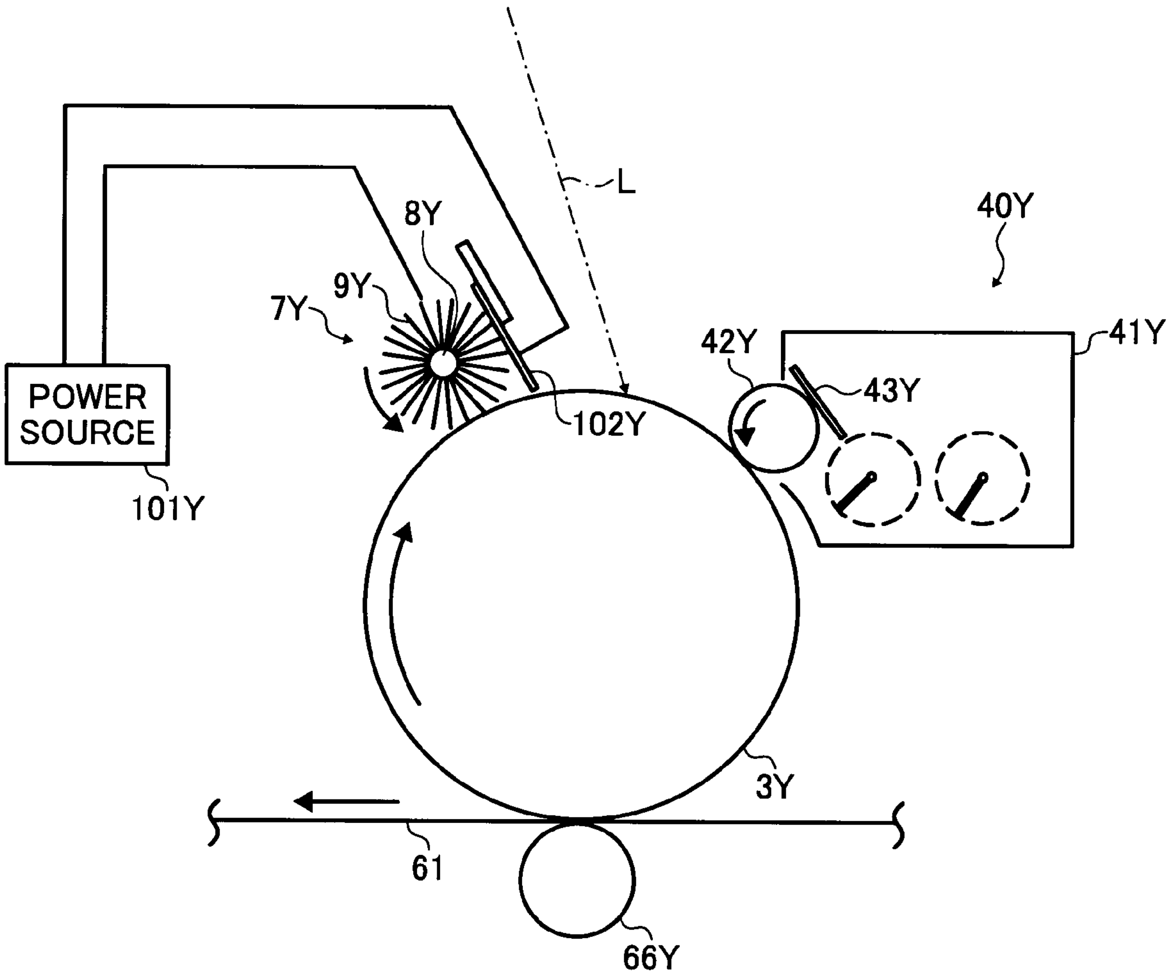
FIG. 6 is an enlarged view of a process unit for Y and an intermediate transfer belt in a first modification example of the printer of FIG. 1.

FIG. 6 is an enlarged view of the process unit 1Y and the intermediate transfer belt 61 in a first modification example of the printer according to the embodiment. The process unit 1Y is provided with a charging brush roller 7Y as a charging member, as a substitute for the charging roller 4Y. The charging brush roller 7Y includes a metal rotation shaft member 8Y and a plurality of conductive fibers 9Y projecting from the surface of the rotation shaft member 8Y. The charging brush roller 7Y is rotated counterclockwise about the rotation shaft member 8Y by a drive unit, not shown, so that front ends of the fibers 9Y are brought into contact with the photosensitive element 3Y in a sliding manner.

To the metal rotation shaft member 8Y, a charge bias application device including the power source 101Y, wiring, etc. is connected to apply a charge bias thereto. In this configuration, the surface of the photosensitive element 3Y is uniformly and negatively charged by causing a discharge between each of the fibers 9Y and the photosensitive element 3Y.

Each of the fibers 9Y is a conductive fiber that is cut to a predetermined length. The conductive fiber is formed of, for example, resin materials including Nylon 6 (registered trademark), Nylon 12 (registered trademark), acrylic, vinylon, polyester, etc. Conductive particles, for example, carbon, metal powder, etc., are dispersed in the resin material to provide conductive properties. A conductive fiber formed by dispersing carbon in a nylon resin is preferred considering its low manufacturing cost and a low Young's modulus. The carbon can be unevenly dispersed in the fiber. The rotation shaft member 8Y, a base for planting the plurality of fibers 9Y, is formed of, for example, stainless steels including SUS303, SUS304, SUS316, SUS416, SUS420, SUS430, etc. In addition, free-cutting steels including SUM22, SUM23, SUM23L, SUM24L, etc., or their plated steels can be used. SUM22 or SUM23 that is subjected to surface treatment by plating is preferred in light of such factors as cost and safety (i.e., lead-free).

In the printer according to the first modification example, each of the process units 1Y, 1M, 1C, and 1K employs a cleaner-less system. The cleaner-less system is a system with no dedicated cleaning unit that removes and collects residual toner on a latent image bearing member when performing an image forming process on the latent image bearing member, for example, the photosensitive element 3Y. The dedicated cleaning unit is a device that detaches the residual toner from the latent image bearing member and conveys the residual toner to a waste toner container to collect the residual toner therein or to a development device to reuse the residual toner so that the detached residual toner does not return and adhere to the latent image bearing member. The cleaning unit includes a drum cleaning device that removes residual toner from a latent image bearing member.

The cleaner-less system is described in detail below. There are three main types of the cleaner-less system: a dissipation and pass type, a temporal capture type, and a combination type thereof.

The dissipation and pass type is a cleaner-less system in which a dissipation member, for example, a brush, slides on a latent image bearing member and scrapes residual toner thereon to reduce adhesion of the residual toner to the latent image bearing member. Then, the residual toner on the latent image bearing member is electrostatically transferred onto a development member, for example, a development roller, in a development region where the development member faces the latent image bearing member or in an area in front of the development region. Thereafter, the residual toner is collected in a development device. Although the residual toner passes a position where a latent image is optically written, the residual toner does not have an adverse effect on writing a latent image when the amount of the residual toner is relatively small.

Specific examples of the dissipation member include a fixed brush including a plurality of conductive fibers attached to a steel plate, a unit casing, etc., a brush roller including a plurality of fibers planted on a metal rotation shaft member, a roller member including a roller portion formed of a conductive sponge, etc.

A fixed brush can be formed with a relatively small amount of fibers, and is therefore inexpensive. However, when a fixed brush is also used as a charging member for uniformly charging a latent image bearing member, the charging uniformity is not sufficient. A brush roller is preferable in this regard.

The temporal capture type is a cleaner-less system in which a capture member, for example, a rotation brush member contacts a latent image bearing member and temporarily captures residual toner thereon while endlessly rotating with the surface of the latent image bearing member. The residual toner captured on the capture member is discharged and returns to the latent image bearing member after a print job or at an interval between sheets of paper in a print job. Then, the residual toner is electrostatically transferred onto a development member, for example, a development roller, and the residual toner is collected in a development device.

When the amount of the residual toner increases due to, for example, solid image formation or a paper jam, the dissipation and pass type described above may cause image deterioration since the residual toner is not fully collected to the development member. By contrast, the temporal capture type reduces image deterioration since the residual toner captured using the capture member is transferred to the development member little by little.

The combination type is a cleaner-less system using the dissipation and pass type in combination with the temporal capture type. Specifically, for example, a rotation brush member contacting a latent image bearing member is used as both a dissipation member and a capture member. Such a rotation brush member functions as a dissipation member when a DC voltage is applied thereto and functions as a capture member when a DC biased AC voltage is applied thereto.

The process unit 1Y illustrated in FIG. 6 employs a cleaner-less system of the temporal capture type. Specifically, the photosensitive element 3Y contacts the front side of the intermediate transfer belt 61 to form the primary transfer nip for Y therebetween while rotating clockwise at a predetermined linear speed. The charging brush roller 7Y uniformly and negatively charges the surface of the photosensitive element 3Y by causing a discharge between the charging brush roller 7Y and the photosensitive element 3Y. At the same time, residual toner remaining after transfer on the photosensitive element 3Y is transferred onto the plurality of fibers 9Y by the action of the charge bias described above, thereby temporarily capturing the residual toner. Then, the charge bias is changed from a DC biased AC voltage to a DC voltage after a print job or at an interval between sheets of paper in a print job so that the residual toner captured on the fibers 9Y returns onto the photosensitive element 3Y. Then, the residual toner on the photosensitive element 3Y is collected in the development device 40Y via the development roller 42Y.

When an image forming apparatus has no unit for removing residual toner on the upstream side of the charging nip on a photosensitive element relative to the direction of movement of the surface of the photosensitive element as in the first modification example, substantially all of the residual toner enters the charging nip, meaning that the amount of the reversely charged toner that transfers to a charging member increases. Therefore, providing a toner charge promotion unit is effective in reducing image deterioration caused by accumulation of the reversely charged toner on the charging member.

While the printer according to the embodiment includes a drum cleaning device for the photosensitive element, the drum cleaning device is removed in the test described above. Thus, the test apparatus used has substantially the same configuration as that employing the cleaner-less system.

Next, examples of printers having additional characteristics are now described. The printers described in the following examples have the same configuration as that of the above-described embodiment, unless otherwise specified.

In a printer according to a first example of the present invention, the power source for the bias application unit applies a charge bias to the charging roller and a different-valued bias to the conductive sheet that contacts the charging roller to generate a potential difference of from 200 V to 1,000 V between the charging roller and the conductive sheet. When a potential difference between a charging member, for example, the charging roller, and a conductive member, for example, the conductive sheet, is too small, a discharge is not generated, and therefore reversely charged toner is not charged with the regular polarity. When the potential difference is too large, the degree of damage to the charging member or the conductive member caused by the discharge sharply increases.

When an overlapped voltage is adopted as the charge bias, the different-valued bias is formed of DC voltage having the regular polarity of toner and has an absolute value at least 200 V higher than the peak value of the AC component (AC voltage) of the charge bias on the regular polarity side and 1,000 V or less higher than the peak value of the AC component of the charge bias on the opposite side.

When an overlapped voltage is adopted as the different-valued bias, the charge bias is preferably formed of a DC voltage. As the different-valued bias of the overlapped voltage, a bias having the peak value on the side of the regular polarity that is 200 V to 1,000 V higher than the charge bias is adopted.

In a printer according to a second example of the present invention, the charging roller serving as a charging member for each of the process units 1Y, 1M, 1C, and 1K has a surface resistance of from $10^2$ Ω/cm$^2$ to $10^8$ Ω/cm$^2$. When the surface resistance of the charging member is too small, leakage of electric current tends to sharply increase between the charging member and the photosensitive element or the conductive member in the charging nip or in the toner charge promoting nip. The considerable leakage of electric current causes significant wearing of the charging member or the conductive member. When the surface resistance of the charging member is too large, the voltage tends to drop sharply in the charging member and thus the potential of the surface of the charging member tends to be reduced to an extremely low level compared to the charge bias. As a result, the potential difference is insufficient to generate a discharge between the charging member and a photosensitive element, which causes insufficient charging of the photosensitive element.

In a printer according to a third example of the present invention, the conductive sheet for each of the process units 1Y, 1M, 1C, and 1K charges toner with a regular polarity by abrasive contact with the toner while the conductive sheet is charged with a reverse polarity. Specifically, the conductive sheet includes nylon as a matrix resin material and the toner includes a positively charged matrix resin. The conductive sheet and the toner have a relation such that, when the conductive sheet makes an abrasive contact with the toner in the toner charge promoting nip, the toner is negatively charged, i.e., charged with the regular polarity by friction, and the nylon conductive sheet is positively charged, i.e., charged with the reverse polarity by the friction. By charging the toner with the regular polarity by friction with the conductive sheet, reversely charged toner is immediately charged with the regular polarity.

In each of the process units 1Y, 1M, 1C, and 1K in a printer according to a fourth example of the present invention, the charging roller contacts the conductive sheet to form the toner charge promoting nip therebetween with a nip width of from 1 mm to 6 mm (length in the direction of movement of the surface of the charging roller). When the nip is too narrow, reversely charged toner that remains reversely charged after passing the toner charge promoting nip sharply increases. When the nip is too wide, the reversely charged toner stops decreasing. Therefore, a further increase in nip width has no positive effect but instead has a significant adverse effect of increasing apparatus size.

Figure 7:
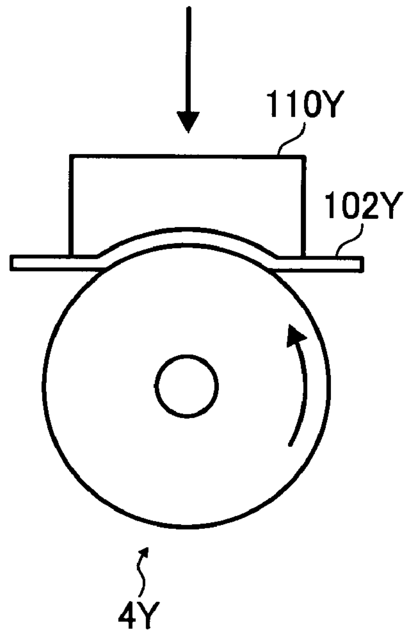
FIG. 7 is an enlarged view of a charging roller and a conductive sheet in a process unit for Y in a printer according to a fifth example of the present invention.

FIG. 7 is an enlarged view of the charging roller 4Y and the conductive sheet 102Y in the process unit 1Y in a printer according to a fifth example of the present invention. In this case, the conductive sheet 102Y is not supported in a cantilevered manner in which the free end thereof contacts the charging roller 4Y. As illustrated in FIG. 7, a sponge 110Y serving as an elastic member presses the side of the conductive sheet 102Y opposite the side contacting the charging roller 4Y. The conductive sheet 102Y is pressed against the charging roller 4Y by the sponge 110Y. In this configuration, the conductive sheet 102Y is bent along the curvature of the charging roller 4Y while contacting the charging roller 4Y, and therefore the toner charge promoting nip has a large nip width in comparison with a configuration in which the free end of the conductive sheet 102K contacts the charging roller 4Y.

Each of process units 1M, 1C, and 1K has the same configuration as that of the process unit 1Y.

In each of the process units 1Y, 1M, 1C, and 1K in a printer according to a sixth example of the present invention, the charging roller contacts the conductive sheet with a pressure of from 0.02 N/mm$^2$ to 0.1 N/mm$^2$. When the pressure is too small, abrasive contact with toner is not sufficient in the toner charge promoting nip. When the pressure is too large, the charging roller makes an abrasive contact with the charging roller with uneven friction force, resulting in uneven friction.

In a printer according to a seventh example of the present invention, the bias application unit for each color is configured such that a DC voltage is applied as the charge bias to the charging roller and an overlapped voltage in which a DC voltage is overlapped with an AC voltage is applied as the different-valued bias to the conductive sheet. In this configuration, a vibrating electric field is formed between the charging roller and the conductive sheet to vibrate toner, and therefore the adhesion of the toner to the charging roller is reduced.

In addition, the bias application unit for each color is configured such that the AC voltage of the different-valued bias has a frequency of from 100 Hz to 3 kHz. When the frequency is too small, vibration of the toner is not sufficient and the adhesion of the toner to the charging roller is not reduced. When the frequency is too large, the vibrating electric field changes too fast for the toner to vibrate accordingly, and the adhesion of the toner to the charging roller is not reduced.

Figure 8:
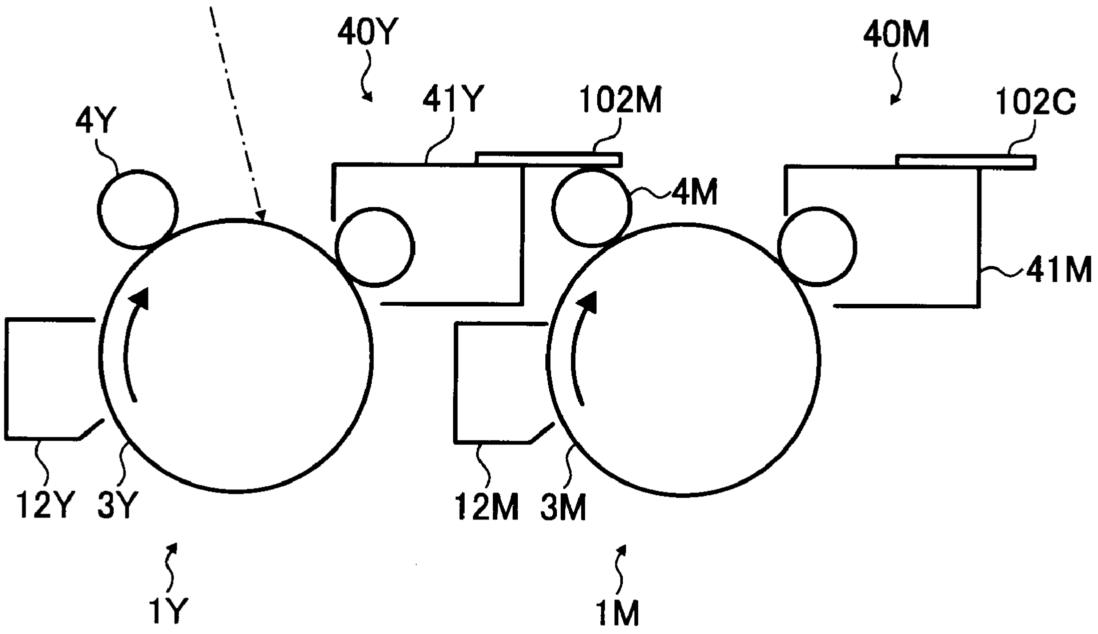
FIG. 8 is an enlarged view of a process unit for Y and a process unit for M in a printer according to an eighth example of the present invention.

FIG. 8 is an enlarged view of the process unit 1Y and the adjacent process unit 1M in a printer according to an eighth example of the present invention. The supported end of the conductive sheet 102M of the process unit 1M is fixed to the casing 41Y of the development device 40Y that functions as a development unit in the process unit 1Y. The free end of the conductive sheet 102M contacts the charging roller 4M of the process unit 1M. Similarly, the supported end of the conductive sheet 102C of the process unit 1C, not shown, that is adjacent to the process unit 1M is fixed to the casing 41M of the development device 40M that functions as a development unit in the process unit 1M.

Each process unit is detachably installed in the printer as a single unit. In addition, the development device is detachably attached to the process unit when the process unit is detached from the printer. Each development device is replaced when toner contained as a one-component developer in the development device is used up. At the same time, the conductive sheet fixed to the casing of the development device is also replaced together with the development device.

In this configuration, the development device and the conductive sheet can be replaced together, and therefore the problem that the charging roller is contaminated with reversely charged toner as the conductive sheet deteriorates is periodically resolved. In the above-described example, the conductive sheet of a process unit is fixed to the development device of an adjacent process unit. Alternatively, the conductive sheet of a process unit can be fixed to the development device of the same process unit. This is preferable in terms of the relationship between the accumulating amount of the toner contacting the conductive sheet (the amount of deterioration) and the replacement timing of the conductive sheet.

The printers described above employ a tandem system that forms a full color image by the processes of forming toner images of respective colors with a plurality of process units, superimposing the toner images on each other, and transferring the superimposed image. The present invention can also be applied to an image forming apparatus that forms a full color image by a single system. In the single system, a plurality of development units for respective colors is provided around a latent image bearing member, for example, a photosensitive element, and an image is formed by forming visible images of the respective colors on the latent image bearing member one by one, superimposing the visible images on each other, and transferring the superimposed image onto an intermediate transfer member. Further, the present invention can also be applied to an image forming apparatus that forms a single color image. In addition, in the printers described above, a single power source that applies different biases makes it possible for the above-described bias application unit to function as both a charge bias application unit and a different-valued bias application unit. It is also possible to have different power sources to output different biases.

In the printer according to the first example of the present invention, the bias application unit for each color applies a charge bias to the charging roller serving as a charging member and a different-valued bias to the conductive sheet serving as a conductive member to generate a potential difference of from 200 V to 1,000 V between the charging roller and the conductive sheet. As described above, by adopting this configuration, it is possible to prevent insufficient charging by the toner charge promotion unit caused by an excessively small potential difference and prevent significant deterioration of the charging roller or the conductive sheet caused by an excessive potential difference.

In the printer according to the second example of the present invention, the charging roller has a surface resistance of from $10^2$ Ω/cm$^2$ to $10^8$ Ω/cm$^2$. As described above, by adopting this configuration, it is possible to prevent wearing of the charging roller or the conductive sheet caused by leakage of electric current and prevent insufficient charging of the photosensitive element caused by an excessively high surface resistance.

In the printer according to the third example of the present invention, the conductive sheet for each color charges toner with the regular polarity by abrasive contact with the toner while the conductive sheet is charged with the reverse polarity. As described above, by adopting this configuration, it is possible to promote charging of the reversely charged toner with the regular polarity by friction and accelerate the charging in the toner charge promoting nip.

In the printer according to the fourth example of the present invention, the charging roller contacts the conductive sheet to form the toner charge promoting nip therebetween with a nip width of from 1 mm to 6 mm in the direction of movement of the surface of the charging roller. As described above, by adopting this configuration, it is possible to prevent a sharp increase in reversely charged toner that remains reversely charged after passing the toner charge promoting nip and prevent an increase in apparatus size caused by an oversized nip width.

In each printer according to the embodiment and each of the examples, the charging roller is used as a charging member, and therefore a number of minute gaps in the toner charge promoting nip increases and the toner charging capability is further improved in the toner charge promoting nip in comparison with a printer using a charging brush or a charging sponge.

In each printer according to the embodiment and each of the examples, the conductive sheet is used as a conductive member, and therefore deterioration of image quality caused by contamination of the charging roller with reversely charged toner is reduced in comparison with a printer using a conductive brush or a conductive sponge.

In the printer according to the embodiment, the conductive sheet is supported in a cantilevered manner and the free end thereof contacts the charging roller, and therefore a nip pressure of the toner charge promoting nip is easily adjusted based on bowing of the free end of the conductive sheet.

In the printer according to the fifth example of the present invention, the conductive sheet is pressed against the charging roller by the conductive sponge serving as an elastic member, and therefore the nip width of the toner charge promoting nip is increased in comparison with a printer in which a free end of a conductive sheet contacts a charging roller.

In the printer according to the sixth example of the present invention, the charging roller contacts the conductive sheet with a pressure of from 0.02 N/mm$^2$ to 0.1 N/mm$^2$, and therefore it is possible to prevent an uneven friction force between the charging roller and the conductive sheet caused by an excessive pressure while making an adequate abrasive contact with toner in the toner charge promoting nip, as described above.

In the printer according to the seventh example of the present invention, the bias application unit for each color is configured such that a DC voltage is applied as the charge bias to the charging roller and an overlapped voltage in which a DC voltage is overlapped with an AC voltage is applied as the different-valued bias to the conductive sheet. By adopting this configuration, it is possible to reduce the adhesion of the toner to the charging roller by forming a vibrating electric field between the charging roller and the conductive sheet and vibrating the toner.

In the printer according to the seventh example of the present invention, the bias application unit for each color is configured such that the AC voltage of the different-valued bias has a frequency of from 100 Hz to 3 kHz. As described above, by adopting this configuration, it is possible to prevent the situation in which the adhesion of the toner to the charging roller is not reduced due to an excessively low or high frequency.

In the printer according to the eighth example of the present invention, the conductive sheet is fixed to the development device serving as a development unit so that the conductive sheet is detached from the charging device together with the development device. Therefore, the problem that the charging roller is contaminated with reversely charged toner as the conductive sheet deteriorates is periodically resolved when the development device is replaced.

As can be understood by those of skill in the art, numerous additional modifications and variations are possible in light of the above teachings. It is therefore to be understood that, within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program or computer program product. For example, the aforementioned methods may be embodied in the form of a system or device, including, but not limited to, any of the structures for performing the methodology illustrated in the drawings.

Even further, any of the aforementioned methods may be embodied in the form of a program. The program may be stored on a computer-readable medium and adapted to perform any one of the aforementioned methods when run on a computer device (a device including a processor). The program may include computer-executable instructions for carrying out one or more of the steps above, and/or one or more of the aspects of the invention. Thus, the storage medium or computer-readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetic storage media, including but not limited to floppy disks (trademark), cassette tapes, and removable hard disks; media with a built-in rewriteable non-volatile memory, including but not limited to memory cards; and media with a built-in ROM, including but not limited to ROM cassettes, etc. Furthermore, various information regarding stored images, for example, property information, may be stored in any other form, or provided in other ways.

Example embodiments being thus described, it will be obvious that the same may be varied in many ways. Such variations are not to be regarded as a-departure from the spirit and scope of the present invention, and all such modifications as would be obvious to one skilled in the art are intended to be included within the scope of the following claims.

What is claimed is:

1. A charging device, comprising:

a charging member configured to uniformly charge a surface of a latent image bearing member in contact therewith;

a charge bias application unit configured to apply a charge bias to the charging member;

a conductive member configured to contact a surface of the charging member, wherein the conductive member is attached to a development unit configured to develop a latent image on the latent image bearing member with toner, and the conductive member is further configured to be detached from the charging device together with the development unit; and a different-valued bias application unit configured to apply a different-valued bias different from the charge bias to the conductive member.

2. The charging device according to claim 1, wherein the different-valued bias is applied to the conductive member while the charge bias is applied to the charging member to generate a potential difference of from 200 V to 1,000 V between the charging member and the conductive member.

3. The charging device according to claim 1, wherein the charging member has a surface resistance of from $10^2$ Ω/cm$^2$ to $10^8$ Ω/cm$^2$.

4. The charging device according to claim 1, wherein the conductive member charges toner with a polarity by abrasive contact with the toner while the conductive member is charged with a reverse polarity.

5. The charging device according to claim 1, wherein the charging member contacts the conductive member to form a nip therebetween of from 1 mm to 6 mm in a direction of movement of the surface of the charging member.

6. The charging device according to claim 1, wherein the charging member comprises a charging roller.

7. The charging device according to claim 1, wherein the conductive member comprises a conductive sheet.

8. The charging device according to claim 7, wherein the conductive sheet is supported in a cantilevered manner and a free end thereof contacts the charging member.

9. The charging device according to claim 1, further comprising an elastic member by which the conductive sheet is pressed against the charging member.

10. The charging device according to claim 1, wherein the charge bias application unit applies a DC voltage to the charging member and the different-valued bias application unit applies a voltage in which a DC voltage is overlapped with an AC voltage.

11. The charging device according to claim 10, wherein the AC voltage has a frequency of from 100 Hz to 3 kHz.

12. An image forming apparatus comprising:

a latent image bearing member configured to bear a latent image;

a latent image forming unit configured to form the latent image on the latent image bearing member;

a development unit configured to develop the latent image on the latent image bearing member with toner; and a charging device, the charging device comprising:

a charging member configured to uniformly charge a surface of the latent image bearing member in contact therewith;

a charge bias application unit configured to apply a charge bias to the charging member;

a conductive member configured to contact a surface of the charging member; and a different-valued bias application unit configured to apply a different-valued bias different from the charge bias to the conductive member, wherein the conductive member is attached to the development unit and is detached from the charging device together with the development unit.

13. The image forming apparatus according to claim 12, wherein the charging member is configured to contact the conductive member with a pressure between 0.02 $N/mm^2$ and 0.1 $N/mm^2$.

14. The charging device according to claim 1, wherein the charging member is configured to contact the conductive member with a pressure between 0.02 $N/mm^2$ and 0.1 $N/mm^2$.

* * * * *